United States Patent [19]

Glista

[11] Patent Number: 5,228,105
[45] Date of Patent: Jul. 13, 1993

[54] PROGRAMMABLE ELECTRO-OPTIC PACKAGING AND INTERCONNECT SYSTEM

[76] Inventor: Andrew S. Glista, 4126 Whispering La., Annandale, Va. 22203

[21] Appl. No.: 634,104

[22] Filed: Dec. 26, 1990

Related U.S. Application Data

[63] Continuation-in-part of Ser. No. 572,384, Aug. 27, 1990, which is a continuation-in-part of Ser. No. 357,959, May 30, 1989, Pat. No. 5,020,152, which is a continuation of Ser. No. 45,469, May 4, 1987, Pat. No. 4,837,856.

[51] Int. Cl.⁵ ............................................. G02B 6/42
[52] U.S. Cl. ..................................... 385/89; 385/135
[58] Field of Search ................................. 385/89, 135

[56] References Cited

U.S. PATENT DOCUMENTS

| | | | |
|---|---|---|---|
| 3,963,920 | 6/1976 | Palmer | 385/89 |
| 4,383,729 | 5/1983 | Suzuki et al. | 350/96.10 |
| 4,678,264 | 7/1987 | Bowen et al. | 350/96.20 |
| 4,699,455 | 10/1987 | Erbe et al. | 350/96.20 |
| 4,730,198 | 3/1988 | Brown et al. | 350/96.20 |
| 4,772,086 | 9/1988 | Bellerby et al. | 350/96.17 |
| 4,845,052 | 7/1989 | Abend | 437/209 |
| 4,861,134 | 8/1989 | Alameel et al. | 350/96.20 |
| 4,863,232 | 9/1989 | Kwa | 350/96.20 |

Primary Examiner—Frank Gonzalez
Attorney, Agent, or Firm—Terry M. Gernstein

[57] ABSTRACT

A programmable electro-optic packaging and interconnect system for computers and parallel processors includes a plurality of network terminals which are packaged in modular form, connected together with optical fibers, connectors and power/ground connections which are embedded in a suitable material to form a monolithic optical backplane. Each terminal includes one or more bypass lines and is connected to the bypass line of at least one upstream terminal. The terminal receives optical data signals from upstream terminals via a primary line and one or more bypass lines which bypass one or more of the upstream terminals. The terminals includes a logic device which analyzes the signals received by the terminal via the primary line and via the bypass line and analyzes or compares these signals to preset values. The logic device selects the signal having characteristics closest to the preset values and rejects the other signals. The logic device likewise activates a built-in test circuit. If multiple signals are rejected for not having characteristics within a preset range, all of the data is rejected. The selected primary or bypass signal is sent to an input/output device such as a computer.

22 Claims, 21 Drawing Sheets

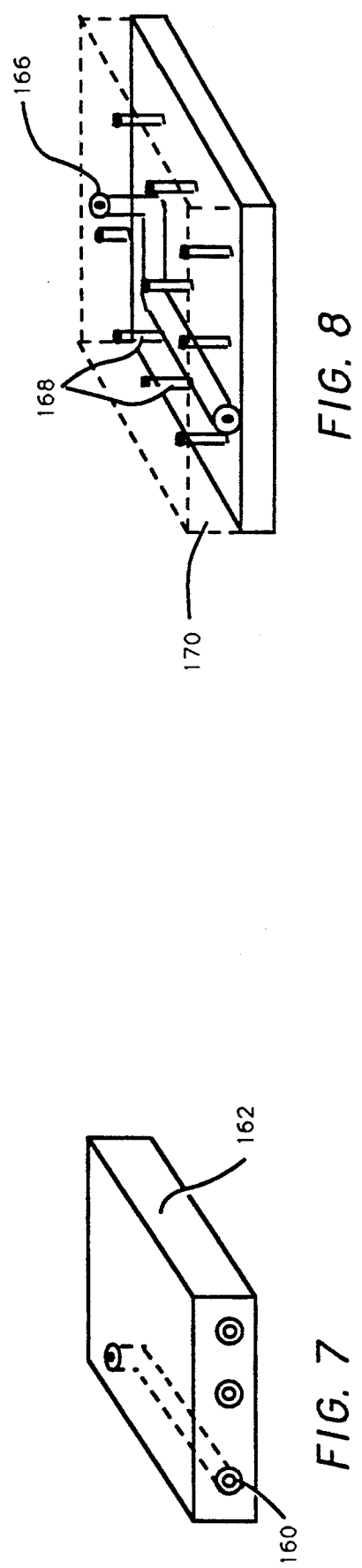

PROGRAMMABLE ELECTRO-OPTIC PACKAGING AND INTERCONNECT SYSTEM

This application is a continuation in part of application Ser. No. 07/572,384, filed Aug. 27, 1990, now allowed, which application is a continuation in part of application Ser. No. 07/357,959, filed May 30, 1989, now U.S. Pat. No. 5,020,152 issued on May 28, 1991, which application is a continuation of 07/045,469, filed May 4, 1987, now U.S. Pat. No. 4,837,856.

TECHNICAL FIELD

The present invention relates in general to data transmission systems in which a plurality of data terminals are interconnected by optical fiber transmission links, and relates more particularly to such a data transmission system for use in high speed, digital, audio or video data transmission.

BACKGROUND ART

Optical data fiber transmission (e.g. high speed data bus, high speed computer interconnect, local area networks (LAN), etc.) has been limited by the availability of a fail-safe multiport optical coupler/repeater. Presently available LAN/data bus concepts have considered various optical energy distribution devices which can be categorized as: (a) passive power splitters (such as fused/biconical couplers) and (b) star couplers (reflective or transmissive) and (c) active repeaters. The devices falling into categories (a) and (b) have the advantage of being completely passive, however, the state-of-the-art of available power launched into an optical fiber, receiver sensitivity and dynamic range and connector, coupler and fiber loss limits the utility of these devices for multiterminal Local Area Networks.

The devices in category (c), active repeaters, lend themselves to high speed multichannel linear or ring network topologies, but the integrity of the network is limited by a single point failure in the fiber or a component or power supply in the active repeater.

A fail-safe switch in the data bus terminal has been used to overcome the last-mentioned problem. Such fail-safe switches have been mechanically or electro-optically actuated switches, and have the drawback of complicating the timing, the synchronization schemes, and/or the signal-to-noise ratio of the overall network. Such switches may not be compatible with both single mode and multi-mode waveguides. Furthermore, these switches may limit data bus or pipeline speeds as they are slow. Still further, mechanical switches or active repeaters may have a tendency to fail in an "on" mode, thereby swamping a downstream terminal, and are somewhat susceptible to vibration, shock, and other such mechanical interference. This last drawback may limit the acceptability of such switches in applications, such as military, where such environmentally induced failures may be totally unacceptable.

Presently, available fail-safe switches cannot accommodate faults, such as a failure in an upstream port in a manner which is both rapid enough for modern technology and which is also rapid and energy-efficient. The mechanical devices are not fast enough for modern applications, and still are susceptible to failure inducing conditions as above discussed. While electro-optical devices may be faster than the mechanical devices, these switches suffer the drawback that they severely limit the distance between stations because they are quite lossy. Often, such switches are active and thus require power for operation, thereby presenting several drawbacks.

A further problem with presently available fail-safe switches used in such systems is that they are not capable of accommodating the "stuck-on" condition of an upstream terminal. As mentioned above, the mechanical switches are susceptible to failure in the "stuck-on" condition. Thus should an upstream terminal fail in the stuck-on mode, presently available fail-safe switches may not be able to accommodate such a condition since many of these switches are set up to determine only if the data being sent to a terminal is "good" and not if there is a swamping condition present in which to much "good" data is being sent to the terminal.

Some presently available terminals have attempted to overcome these problems by providing a fault-detection system within the terminal that samples the signal from one of several redundant receiver/transmitter units within that terminal and then uses the most acceptable signal. Such fault detection systems, while serving to overcome the signal problem at each terminal are often active thereby requiring additional backup power and may also be expensive. Still further, such fault-detection systems make no provision for a total failure of the particular terminal. That is, if the terminal suffers a total failure, all downstream terminals are affected.

Therefore, there is need of a fault-tolerant coupler/repeater for use in high speed optical fiber data transmission systems which is fast enough and which is reliable enough for modern needs, yet which is not unduly lossy or expensive in nature.

OBJECTS

It is a main object of the present invention to provide a fail-safe data bus terminal which allows multiterminal optical fiber distribution without the disadvantages of the presently available devices.

It is another object of the present invention to provide a fail-safe switch which is capable of discriminating between signals and using the best signal for an associated data bus terminal.

It is another object of the present invention to provide a fault/tolerant terminal which includes logic for discriminating between incoming signals.

It is another object of the present invention to provide a fail-safe data bus terminal which has means for providing totally redundant data lines.

It is another object of the present invention to reduce noise in a terminal.

It is another object of the present invention to provide a programmable optical interconnect means based upon predetermined or programmable optical power levels or any selected reference or criterion.

It is another object of the invention to provide a fault tolerant physical layer for fiber optic networks.

It is another object of the invention to provide a fault tolerant fiber optic distribution system for community antenna television (CATV) systems.

It is another object of the invention to provide a video distribution system for computer workstations.

It is another object of the invention to provide a programmable fault tolerant electro-optic packaging and interconnect system for advanced computers and signal processor architectures including hypercubes.

It is another object of the invention to provide a fiber optic multi-dimensional crossbar switch for interconnecting parallel processor computer nodes.

It is another object of the invention to provide a monolithic fiber optic coupler formed by embedding optical fibers and connectors in a suitable material.

SUMMARY OF THE INVENTION

These and other objects are accomplished by a programmable electro-optic packaging and interconnect system for computers and parallel processors includes a plurality of network terminals which are packaged in modular form, connected together with optical fibers, connectors and power/ground connections which are embedded in a suitable material to form a monolithic optical backplane. Each terminal includes multiple detectors and logic circuitry for determining the optical power level in two or more input lines connected to that terminal. The logic circuitry determines the ratio of optical power in the lines or the average power in either line to determine if it is proper, and does not require conversion of an optical signal to an electrical signal to achieve fault tolerance if the ratio or average power is improper. An electrical or optical logic device may be utilized to determine the power or ratio of power in the lines.

The logic circuitry is preset so that if power in any of the input lines is outside of a preset or programmable range as determined by optical power ratio in the lines or average power in either line, the data from another line is selected for use in the terminal. Thus, if the power in a particular input line is too low due to the failure or degradation of an LED, laser, electrical component or fiber, or too high due to a stuck-on failure in a previous terminal, the data in that line will be rejected and not used in that terminal. The logic circuitry is also arranged so that, if several of the data signals being input to the terminal are unacceptable, these signals will be rejected and signals from the last working terminal will be sent on past the terminal via a bypass line. On the other hand, if all of the input data signals are acceptable, the logic circuitry is arranged to use the "best" one of these signals or the sum of all the signals if identical. That is, the signal, the sum of the signals or the average value of the signal that is closest to the optimum signal desired will be selected, and the rest of the signals will be rejected. In the case of a power failure, the bypass enables a signal to reach the succeeding terminal by totally passive means. In addition to power monitoring, suitable photodiodes and logic can likewise be utilized to monitor optical wavelength or polarization for fault detection.

DESCRIPTION OF THE DRAWINGS

FIG. 7 is a schematic of an embedded system;

FIG. 8 is a schematic of another embedded system;

FIG. 9 is a schematic of a modular system with means for connecting other optical or electrical modules thereto;

DETAILED DESCRIPTION OF A PREFERRED EMBODIMENT

Figure 1:
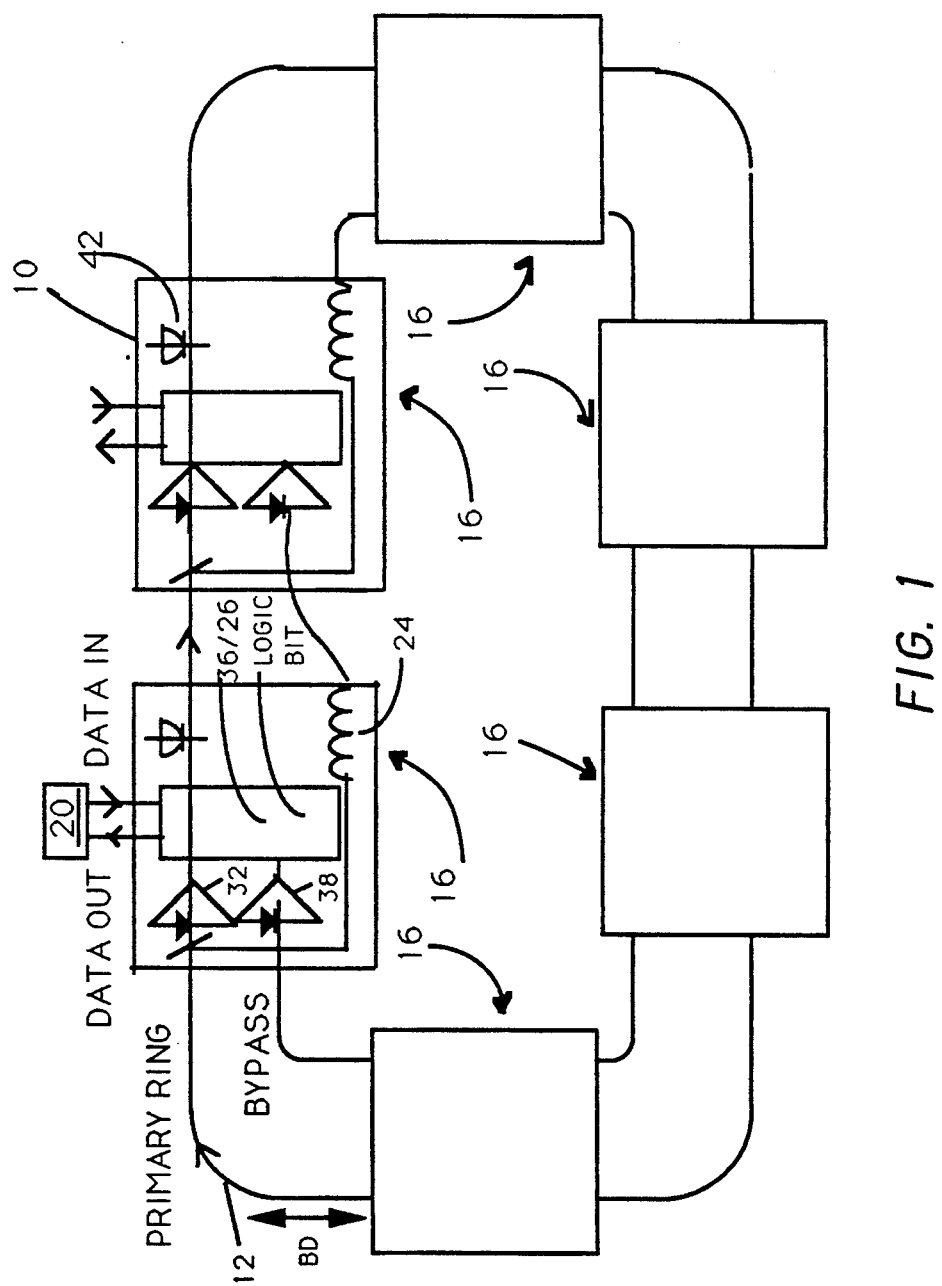
FIG. 1 is a schematic of a ring bus data transmission system in which the terminal embodying the teaching of the present invention is used.

Shown in FIG. 1 is a high speed data transmission system 10 which is in the form of a ring bus and uses fiber optic lines 12 and 14 to transmit data between N terminals 16. In the system 10, line 12 is the primary ring and line 14 is a bypass ring. The lines 12 and 14 are totally redundant and separate whereby a totally redundant data transmission system is formed. Each of the N terminals 16 uses data in the usual manner and includes the usual data input/output mechanisms and devices 20, such as a computer or the like.

Each terminal 16 includes connection means to which the lines 12 and 14 are connected, and can be a unitary element formed of components embedded in a substrate as will be discussed below. There are N terminals with the data transmission direction proceeding from terminal (N−1) to terminal (N) to terminal (N+1) in the downstream direction.

Figure 2:
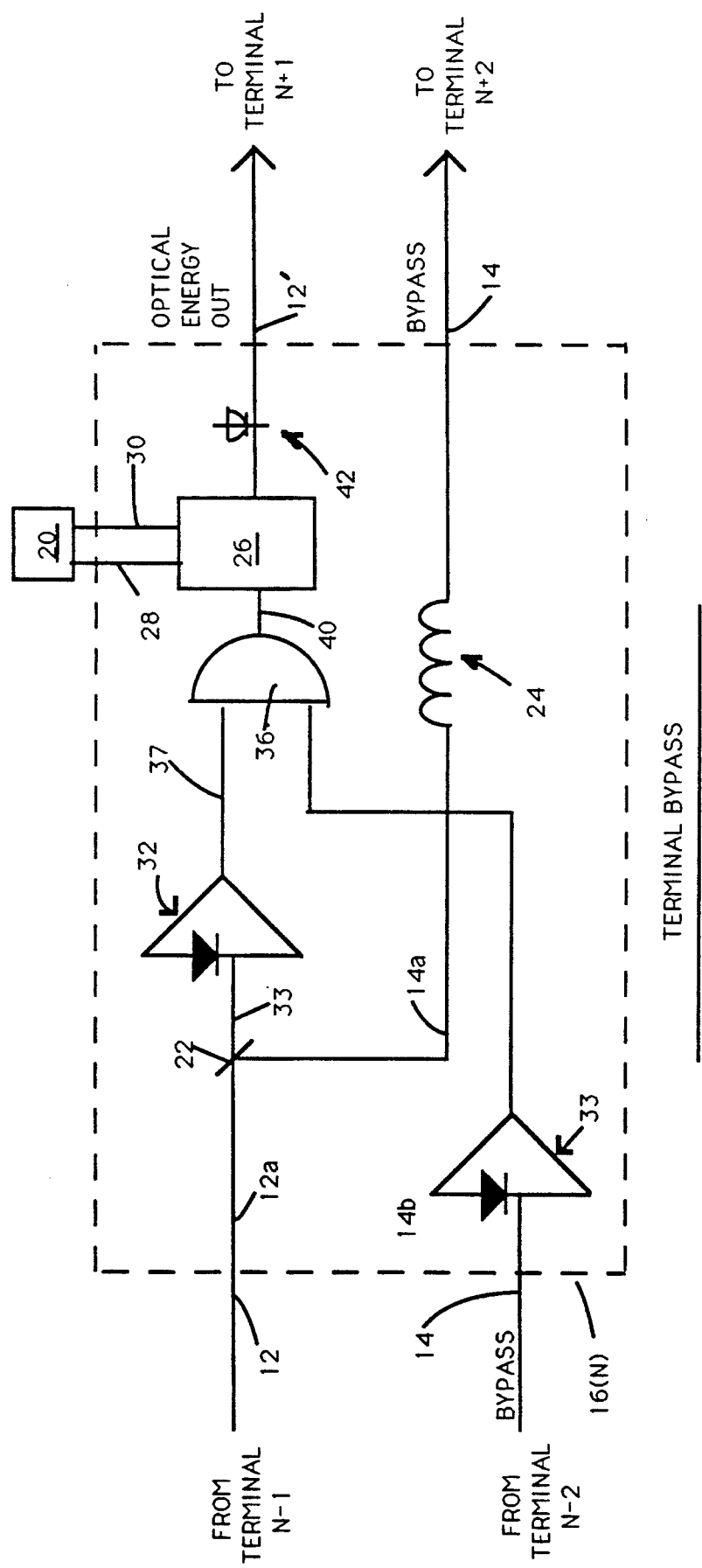
FIG. 2 is a schematic of a data terminal of the FIG. 1 ring bus system.
Figure 11:
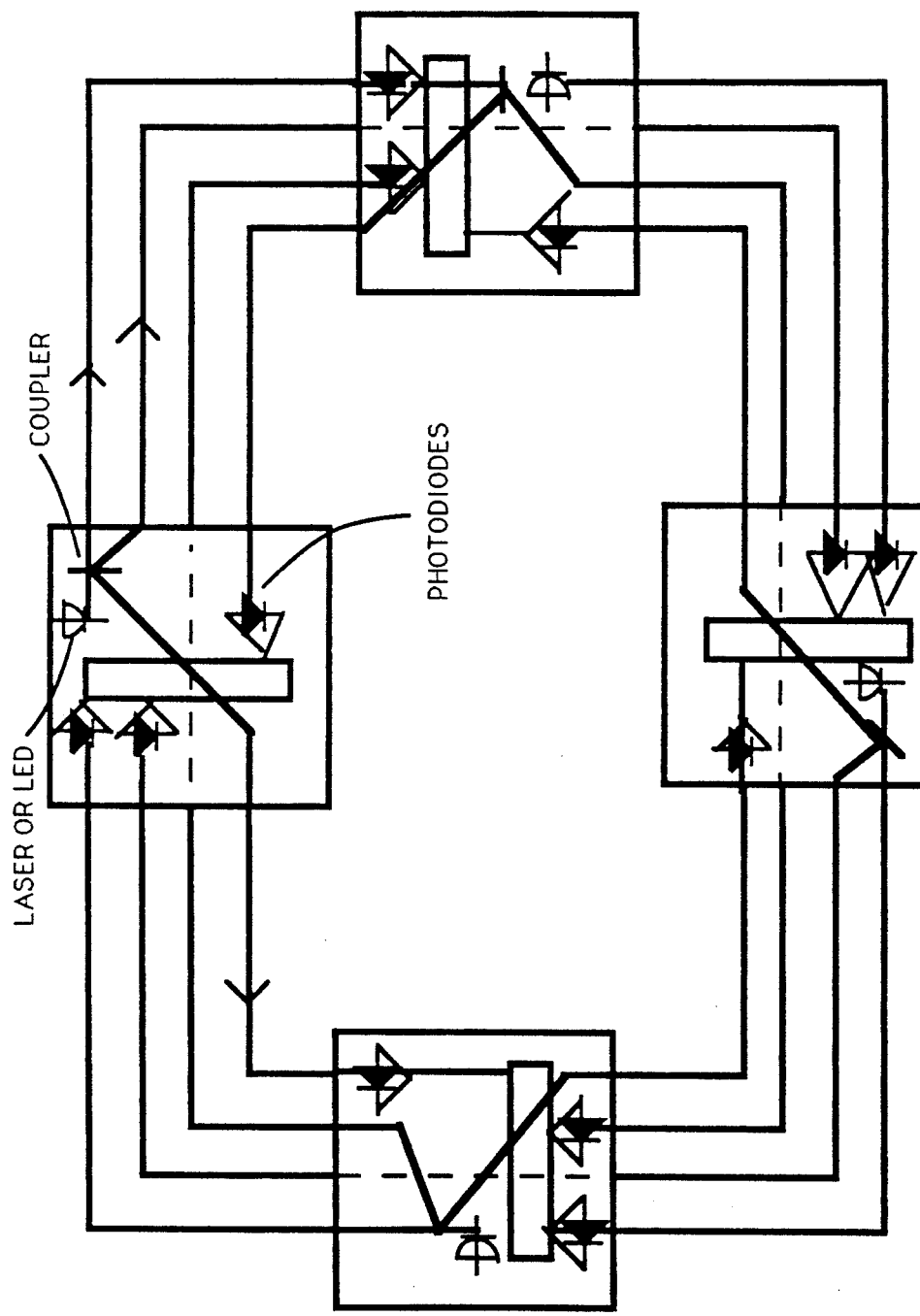
FIG. 11 is a schematic of a bidirectional fault tolerant terminal utilizing electrical logic select means wherein the coupler is placed in the primary line following the laser or LED.
Figure 23:
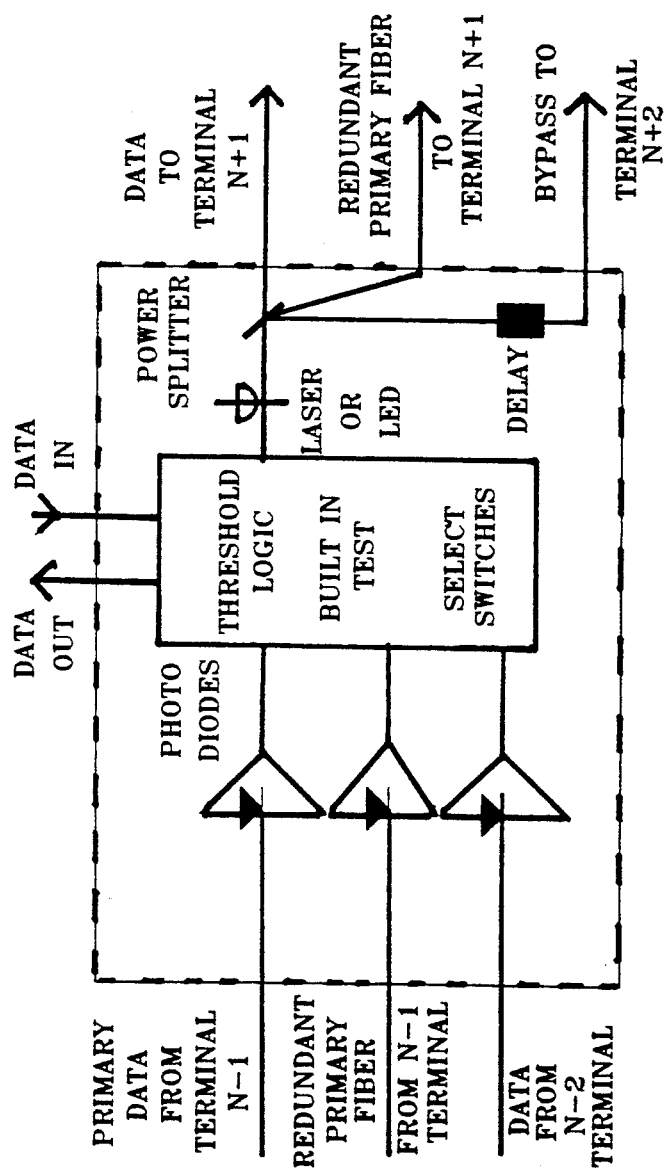
FIG. 23 is a schematic of a fault tolerant terminal with the coupler placed after the LED with a redundant primary fiber and single bypass fiber.

A terminal 16 is best shown in FIG. 2 and attention is now directed thereto. The terminal shown in FIG. 2 is the Nth terminal, and has data input from terminal (N−1) via the optical fiber of primary ring 12 and from terminal (N−2) via the optical line in bypass ring 14. Data is then transmitted to terminal (N+1) via primary ring optical line d' and to terminal (N+2) via bypass ring optical fiber line 14. A power splitting device, such as a fusion coupler 22, is coupled to the primary line 12 by a coupling line and means 12a and couples that primary line 12 to a bypass coupling line and means 14a which is coupled to the bypass ring optical fiber line 14 for the purpose of having a signal bypass the terminal. The coupler, or couplers, can be located outside the terminal to avoid single point failure if required. FIG. 11 shows a configuration where the coupler is placed in the terminal following the laser or LED. This configuration has advantages in providing added redundancy in the primary line if desired as well as providing the capability for bidirectional transmission. The configuration of a terminal providing redundancy in the primary fiber is shown in FIG. 23. Placing the coupler after the laser or LED also provides the capability to provide loopback if the entire cable assembly is severed and this configuration is shown in FIG. 11. An alternative location of the coupler is as a discreet device outside the terminal or as part of an embedded substrate configuration. An embedded power splitting mechanism can be formed by joining together the surface of a connectorized large core optical fiber with the surfaces of an ensemble of connectorized smaller core optical fibers and embedding the entire assembly in a suitable material for the purpose of obtaining a monolithic structure. The connectors for holding the large core fiber and smaller core fiber can be constructed of the same material as the substrate to achieve similar thermal coefficients of expansion.

Figure 20:
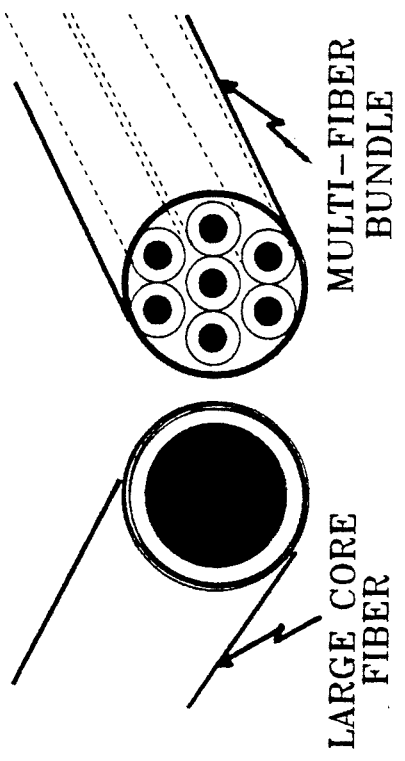
FIG. 20 is a perspective view of the fiber surfaces of a fiber optic coupler for distributing power in a network formed by joining together the surface of a connectorized large core optical fiber with the surfaces of an ensemble of connectorized smaller core optical fibers and embedding the entire assembly in a suitable material for the purpose of obtaining a monolithic structure.
Figure 18:
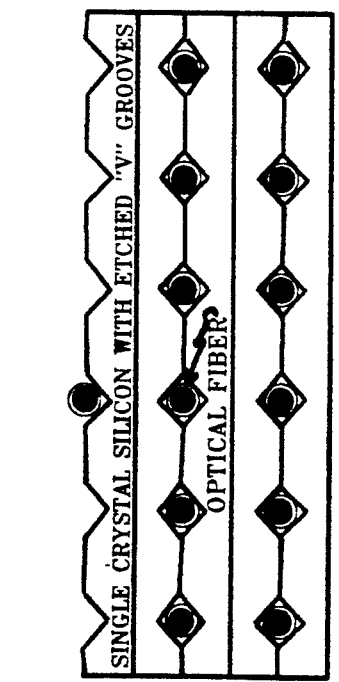
FIG. 18 is a schematic of a V-groove connector which can be embedded in a suitable material to connect to the optical backplane.
Figure 21:
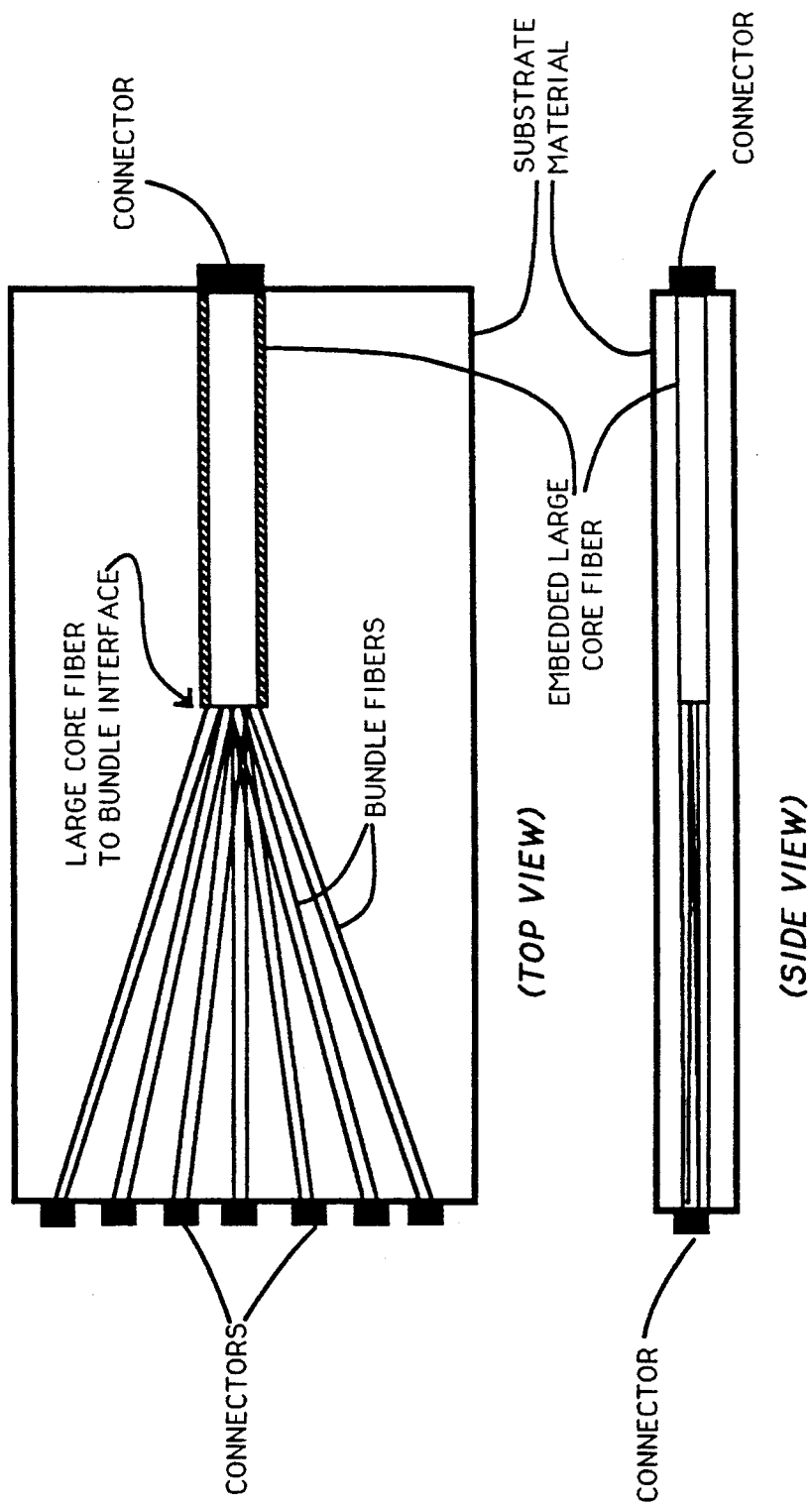
FIG. 21 is a schematic showing the top and front views of the fiber surfaces of a fiber optic coupler for distributing power in a network formed by joining together the surface of a connectorized large core optical fiber with the surfaces of an ensemble of connectorized smaller core optical fibers and embedding the entire assembly in a suitable material for the purpose of obtaining a monolithic structure.

As previously discussed, this coupler can be embedded in the substrate as part of the monolithic optical backplane. The fiber interface of such a coupler is shown in FIG. 20 with seven small diameter fibers adjoined to a single large diameter core fiber. The configuration shown is shown to depict the concept and is not limiting in that other hexagonal close packed circular configurations can provide additional fanout capability. The entire assembly, including connectors, is embedded in a suitable material such as a glass fiber/epoxy composite, plastic, ceramic, glass or other such materials to provide rigidity and environmental compatibility. FIG. 21 shows the top and side views of such an embedded configuration but the arrangement of the elements in the assembly and the selection of materials, including fibers, can be so selected and arranged as to minimize the physical dimensions and weight or to optimize performance.

A delay means 24 can be positioned in the line and means 14a if desired. The fusion coupling 22 and the delay means 24 are known per se, and thus will not be discussed, it being mentioned only that the coupling can be arranged to divide the data into any desired ratio, and the delay means can be arranged to introduce any desired delay into the data signal being transmitted on the bypass line from terminal N to any other terminal to synchronize the incoming signals for the purpose of ease of comparison and analysis. Data from an upstream terminal which is not adjacent to the incident terminal (e.g., the (N−2) terminal) on the bypass line 14 is coupled to the terminal via bypass coupling and means 14b.

The input/output mechanism and/or device 20 receives and sends data from and to a filter or signal shaping circuits 26 or like mechanism or device via input use line 28 and output use line 30. This portion of the terminal can be any suitable element or combination of elements, and will not be discussed further.

Figure 12:
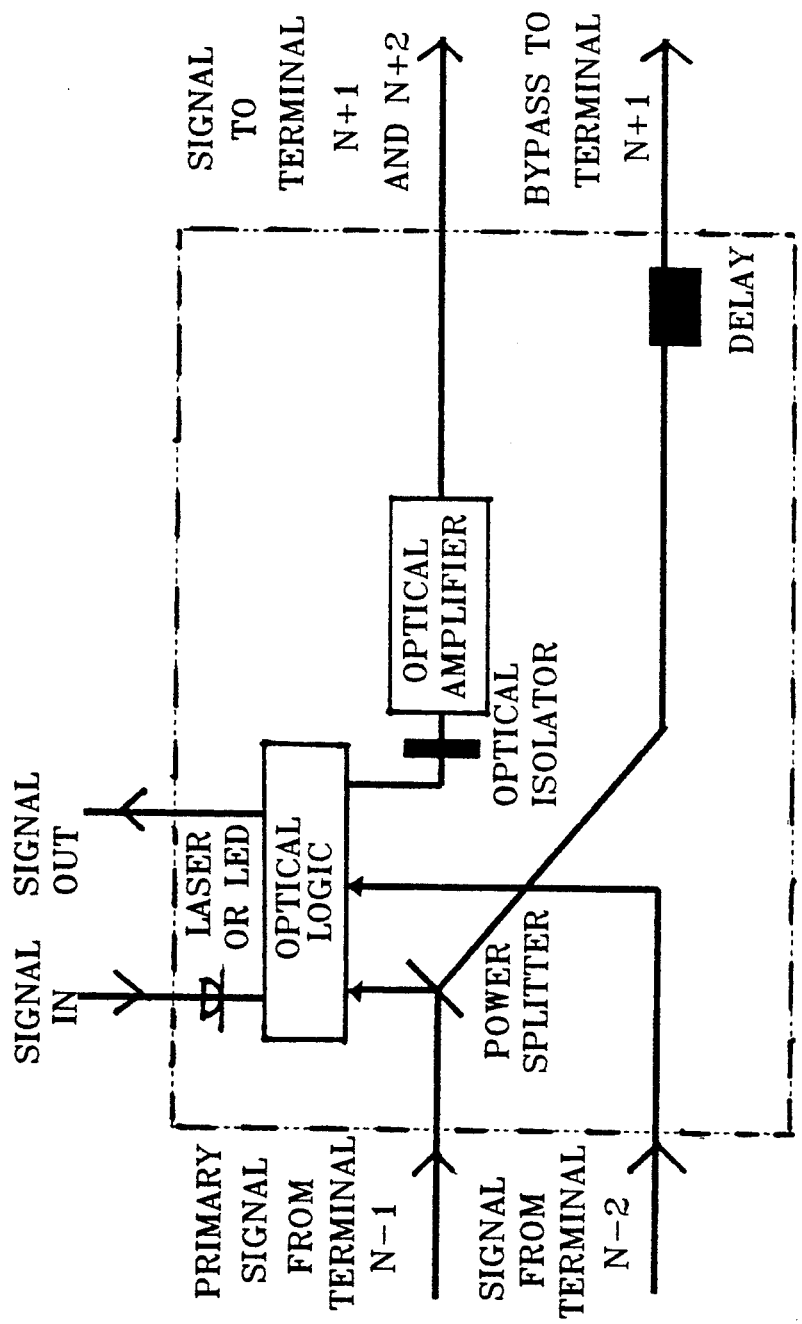
FIG. 12 is a single bypass fault tolerant terminal which utilizes optical select logic and an optical amplifier.
Figure 14:
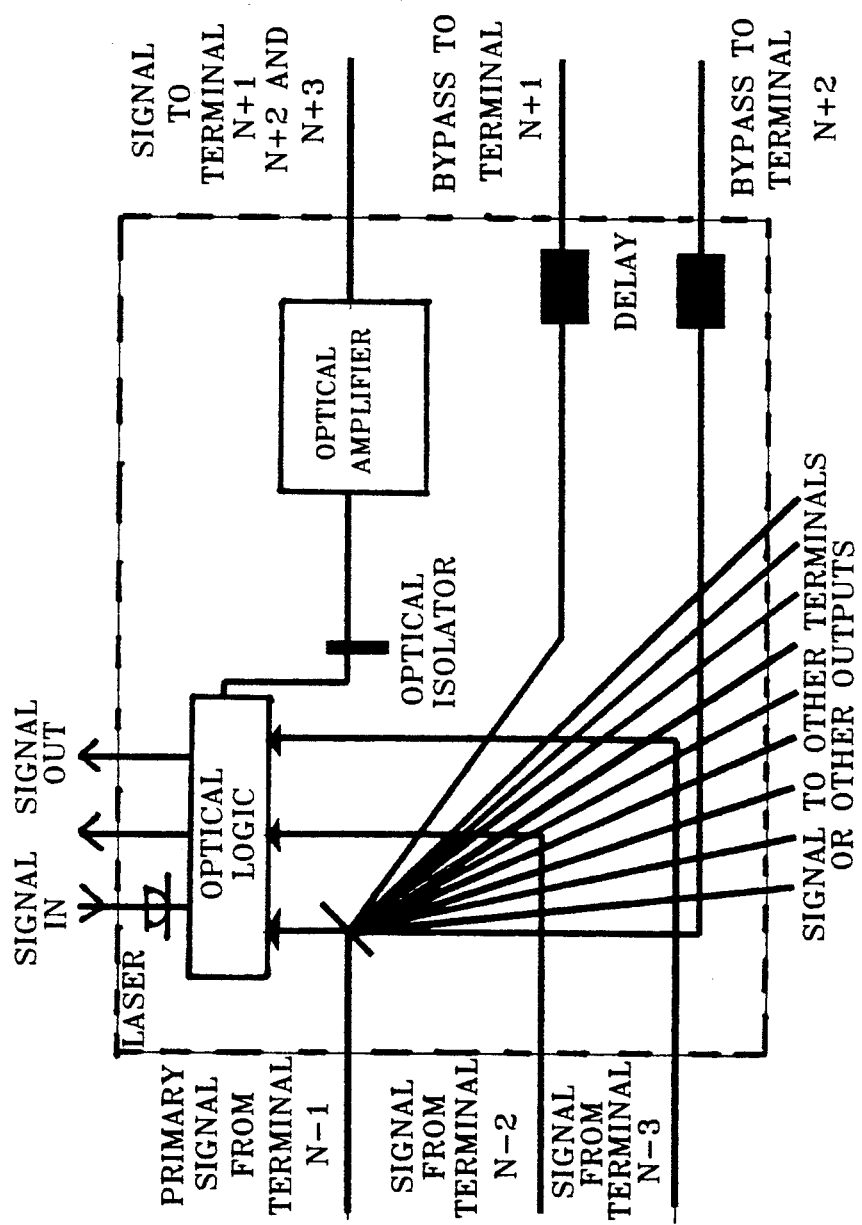
FIG. 14 is a schematic of a multiple bypass terminal which utilizes an optical logic select means and an optical amplifier as the means to boost the signal from terminal (N−1), (N−2), or (N−3). It also provides a branching means for signal distribution such as might be utilized in an interactive community antenna television system (CATV) system.

Data on the primary line 12 is transmitted from the fusion coupler to a photo diode 32 via a line 33 and from such photo diode to a logic circuit 36 via line 37. Data on the bypass line 14 is transmitted from terminal (N−2) via the means 14b to a photo diode 38 and then via line 39 to the logic circuit 36. The logic circuit 36 determines which of the data signals from either line 12 or from line 14 is to be used by the terminal N and passes that signal on to the filter 26 via data line 40 for use by the input/output mechanism 20. An optical source 42 is positioned in the primary line 12' to transmit output from the terminal N or boost signal from terminal (N−1). An alternative means of boosting power in a given terminal is through the use of an optical amplifier. This device does not require conversion of an optical signal to an electrical to achieve fault tolerance. Such devices also serve to reduce noise in a terminal. One example is a Fabry-Perot interferometer amplifier consisting of a gain cavity fabricated with the appropriate semiconductor material with an electrical or optical pumping means. Another example is an optical fiber amplifier consisting of a rare earth doped fiber cavity and suitable optical pumping means. Other optical amplifiers include stimulated Raman amplifiers and Kerr effect amplifiers and all of the above such devices are known per se and will not be discussed further but are mentioned as alternative sources for boosting power in a terminal. FIG. 12 is a schematic of a single bypass fault tolerant terminal utilizing an optical amplifier to reduce noise and to eliminate the need for conversion of an optical signal to electrical to achieve fault tolerance. FIG. 14 is a schematic of a multiple bypass fault tolerant terminal utilizing an optical amplifier. The use of optical amplifiers is especially useful in analog video distribution such as community antenna television (CATV) systems where electronic conversion of signals can cause noise or distortion limiting the number of terminals or signal quality.

The logic circuit 36 receives the primary signal from terminal (N−1) via the photo diode 32 and the bypass signal from another terminal, such as terminal (N−2), via photo diode 38, analyzes those two signals, rejects the signal having a power which is out of a preset ratio and uses the other signal for the terminal N. In this manner, a weak signal, an interrupted signal, or even a signal which is too powerful, can be rejected and will not be passed on for use by the device associated with the terminal N. Only a signal having a desired (instantaneous or average) power will be used. The logic circuit 36 can be set to select the signal to be used by the terminal N according to any standard, such as instantaneous or average power, range, noise, spectral content or the like. Only data signals having the desired characteristics will be used and all others will be rejected by the logic circuit 36. Furthermore, the logic circuit 36 is arranged to reject several of the input signals if none of these signals fall within the preset range. Still further, the logic circuit 36 is also arranged to use the signal that is closest to a preset optimum if all of the signals are otherwise acceptable. If multiple signals from previous terminals are rejected, these terminals are, in essence, shut down, and the logic circuit can include some means for transmitting a Built-In-Test signal telling any or all downstream terminals of the failure. The remaining bypass line or lines can then be used for keeping the ring intact.

Figure 3:
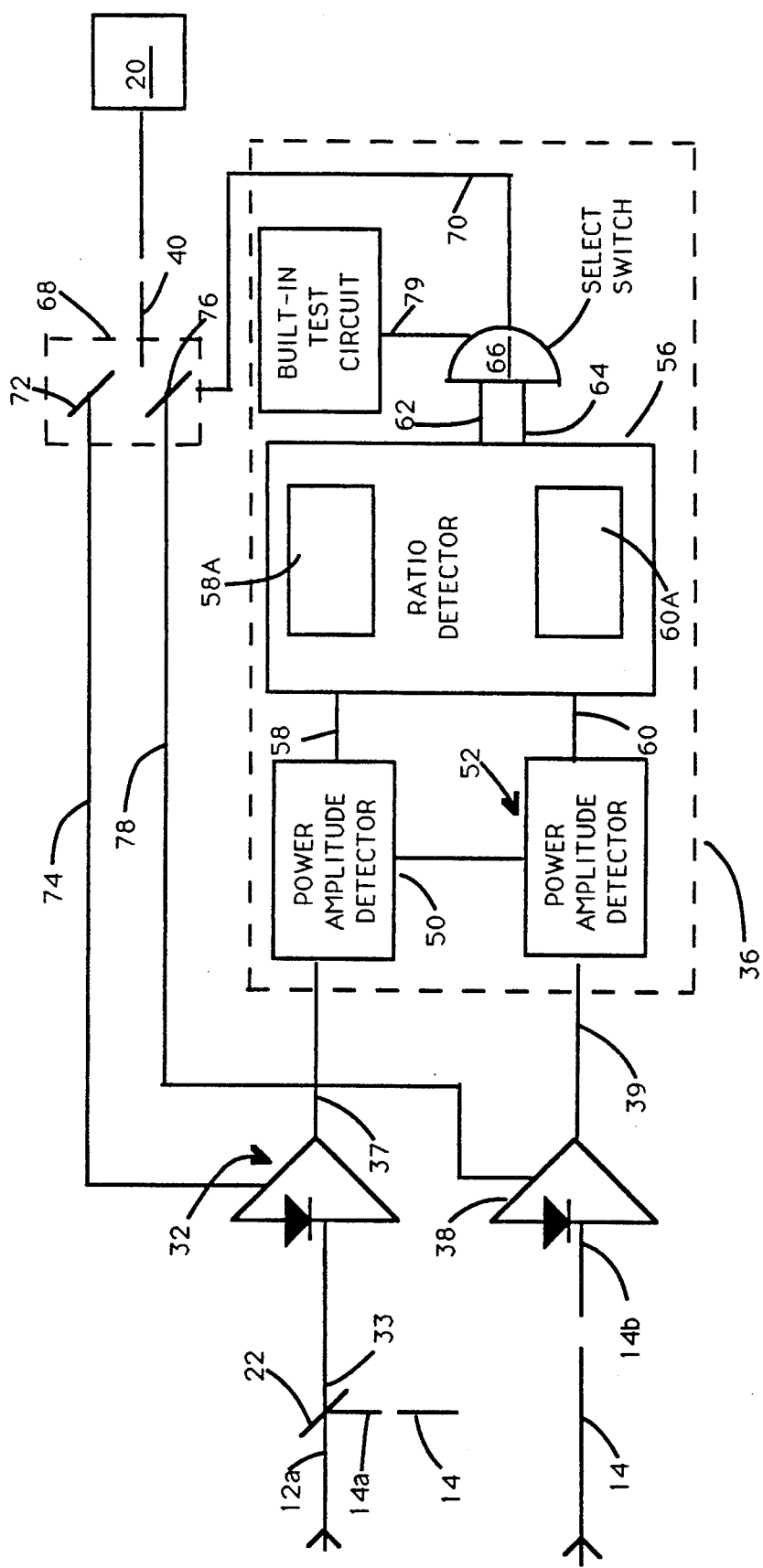
FIG. 3 is a schematic of the logic circuitry used in the terminal of the present invention.
Figure 4:
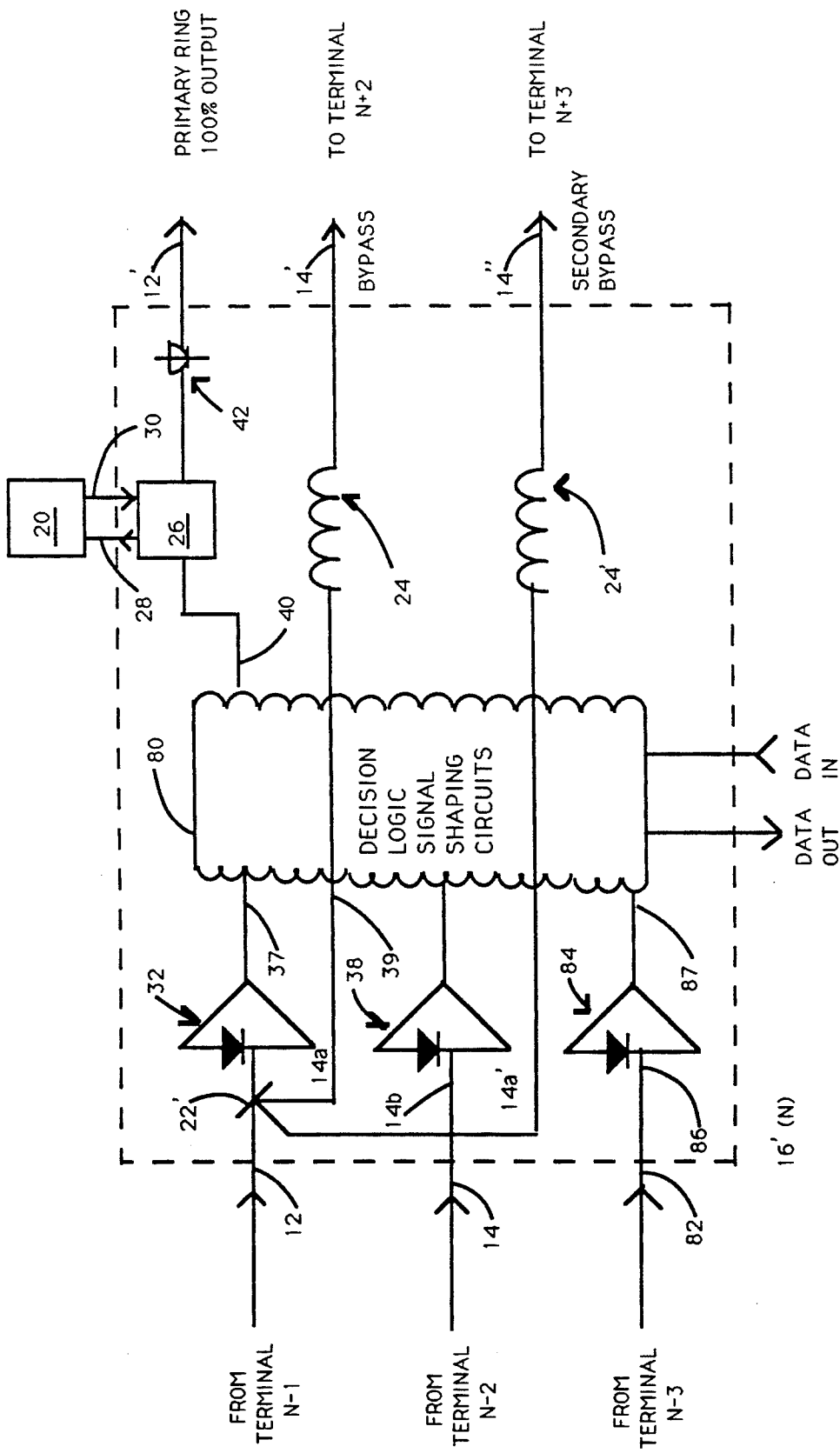
FIG. 4 is a schematic of a terminal in a data transmission system using at least three input lines.

The logic circuit 36 is best shown in FIG. 3, and attention is now directed to that figure. As discussed above, data line 40 is connected to the input/output device 20 associated with the terminal N via a filter, signal shaping circuit or other such equipment as necessary and data to be used by that mechanism is transmitted thereto over line 40. The data to be placed on line 40 comes either from the primary line 12 via line 33 or from bypass line 14 via line 14b depending on the instantaneous or average power, noise, etc. in these signals. The logic circuit 36 chooses the more desirable data signal and rejects the other, or several if necessary, as is the case in multiple bypass systems (see FIG. 4).

To accomplish this result, the logic circuit includes power detector circuits 50 and 52 connected to photodiodes 32 and 38 respectively via lines 37 and 39 respectively. These circuits measure the instantaneous amplitude of the light or integrated average power of the light. A suitable optical device can also be used for this purpose thereby avoiding the problems associated with translation of optical to electrical signals.

Figure 13:
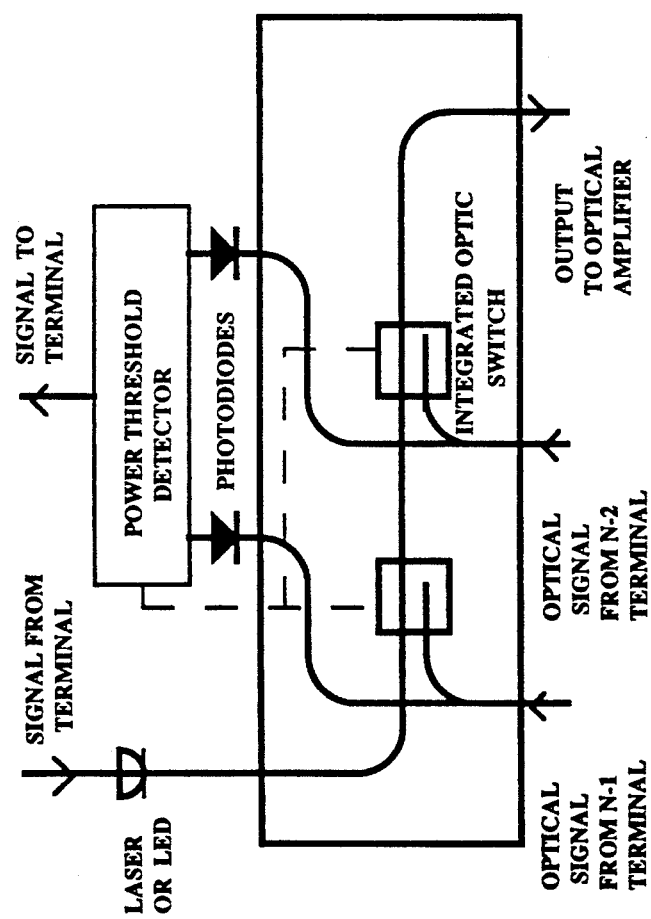
FIG. 13 is a schematic of an optical select logic means for a single bypass terminal utilizing an integrated optic switch to switch the optical signal from the primary input fiber to the bypass fiber in case of a failure in the N−1 terminal.

An alternative optical logic select means avoids the problems associated with the translation of optical to electrical signals and is shown in FIG. 13. Such optical logic means are known per se and include bistable optical elements or optical threshold switches or integrated optical switches. The former are activated by the strength of the optical signal where the latter are activated by an electrical signal. These optical devices serve to switch the signal from the primary input fiber or bypass fiber to a fiber attached to the optical amplifier. The primary optical signal fiber is attached to a photodiode and is analyzed for the proper power, amplitude, frequency, etc. in the electrical domain. The input from the bypass fiber is likewise attached to a photodiode and its signal is likewise analyzed. A switching signal is then sent to the integrated optical switches which sends the signal from the primary or bypass optical fiber to the optical amplifier. Such an implementation eliminates the need for converting signals form the optical to electrical domain prior to amplification and thus limits the noise or distortion. This is especially useful in analog video transmission. FIG. 12 shows a terminal containing such optical logic select means.

The results of these analyses are fed to a power ratio detector 56 along lines 58 and 60. The power ratio detector 56 is preset proportional to the power division ratio in the coupler of the N−1 terminal and selects the proper data signal and, using either line 62 or 64, which will actuate logic select device 66 accordingly. The logic select device 66 controls a switch mechanism 68 via line 70. Power integrating pulse accumulation circuits (such as 58A or 60A) can be used to determine average power on the line and can detect an LED or laser which is "stuck-on" in a previous terminal. This circuit will also activate the logic select means. The switch mechanism 68 includes a switch 72 connected to the photo diode 32 by a line 74 and a switch 76 connected to the photodiode 38 by a line 78. The logic circuit can also include a built in test circuit connected to the select device 66 by a line 79 to be actuated in the event one of the data lines contains a data signal with undesirable characteristics. The built in test circuit can include a suitable visual and/or audible alarm to signal that a data signal on one or more of the data lines coming into the terminal has undesirable characteristics. The visual signal can include data as appropriate. The built in test circuit can also transmit information concerning component failures to other nodes in the network.

The switch select device 66 actuates either switch 72 in line 74 connected to the primary input line 12 or switch 76 in line 78 connected to the bypass line 14 to pass the data in such selected line to the input/output device via line 40. The logic circuit is shown as using power as the test for which data input line to use, but other indicia can be used as well. It is also noted that the dotted outline OL shown in FIG. 3 can also represent a monolithic chip incorporating the various elements of the circuit.

Figure 10:
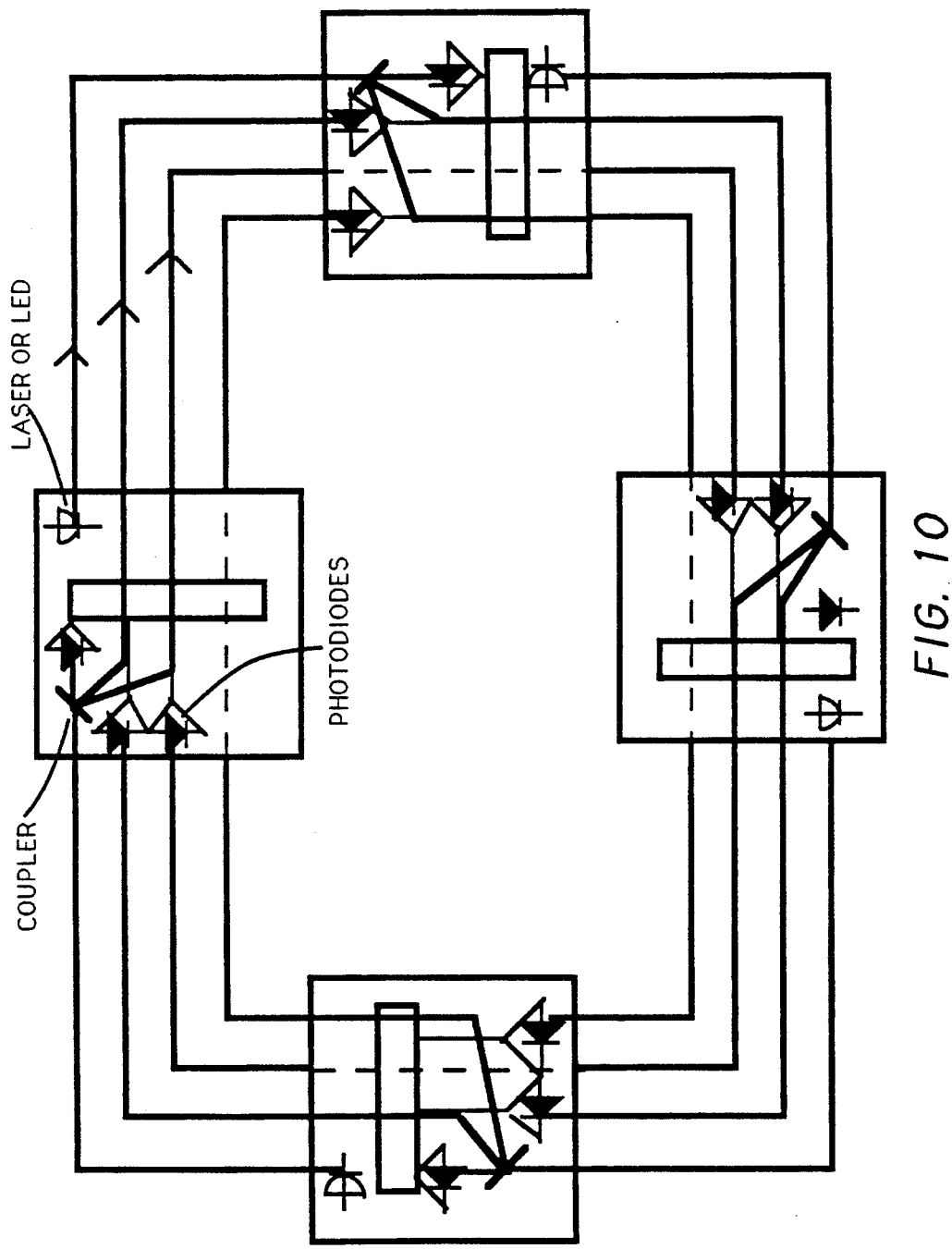
FIG. 10 is a schematic of a dual bypass ring bus data transmission system in which three input lines and photodiodes are employed.

While the FIG. 3 logic circuit is shown as being used in conjunction with two input lines, these or more data input lines can be used. This situation is indicated schematically in FIG. 4. A logic circuit 80 is associated with terminal 16' and receives data from terminal (N−1) via the primary data line 12, from terminal (N−2) via bypass line 14, and from terminal (N−3) via a secondary bypass line 14, and from terminal (N−3) via a secondary bypass line 82. The logic circuit 80 samples those data and uses the data having the desired characteristics while rejecting the rest as above described in conjunction with the description of logic circuit 36. Accordingly, in addition to photo diodes 32 and 38, the terminal 16' includes a photodiode 84 connected to the secondary bypass line 82 by an input connection and means 86 and to the logic circuit 80 by a line 87. The logic circuit 80 samples the data from the photo diodes 32, 38, and 84, analyzes that data for the selected parameter, and selects the data having the desired characteristics while rejecting the other data. The selected data is transmitted to the device 20 via line 40 in the manner described above in regard to the logic circuit 36. A dual bypass network utilizing the terminal configuration shown in Figure is depicted in FIG. 10.

Since the terminal 16' is associated with three downstream terminals (N+1), (N+2), and (N+3) as well as with three upstream terminals (N−1), (N−2) and (N−3), the terminals 16' includes an additional bypass line 14a' connected to a fusion coupler 22', and, optionally, includes a delay means 24'. In the manner of terminal 16, terminal 16' can include a repeater 42 in the primary ring data line 12'.

As can be seen from this disclosure, a terminal N can be associated with any number of upstream terminals and/or with any number of downstream terminals and/or any combination thereof depending on the level of redundancy of fault tolerance required in the network.

Figure 22:
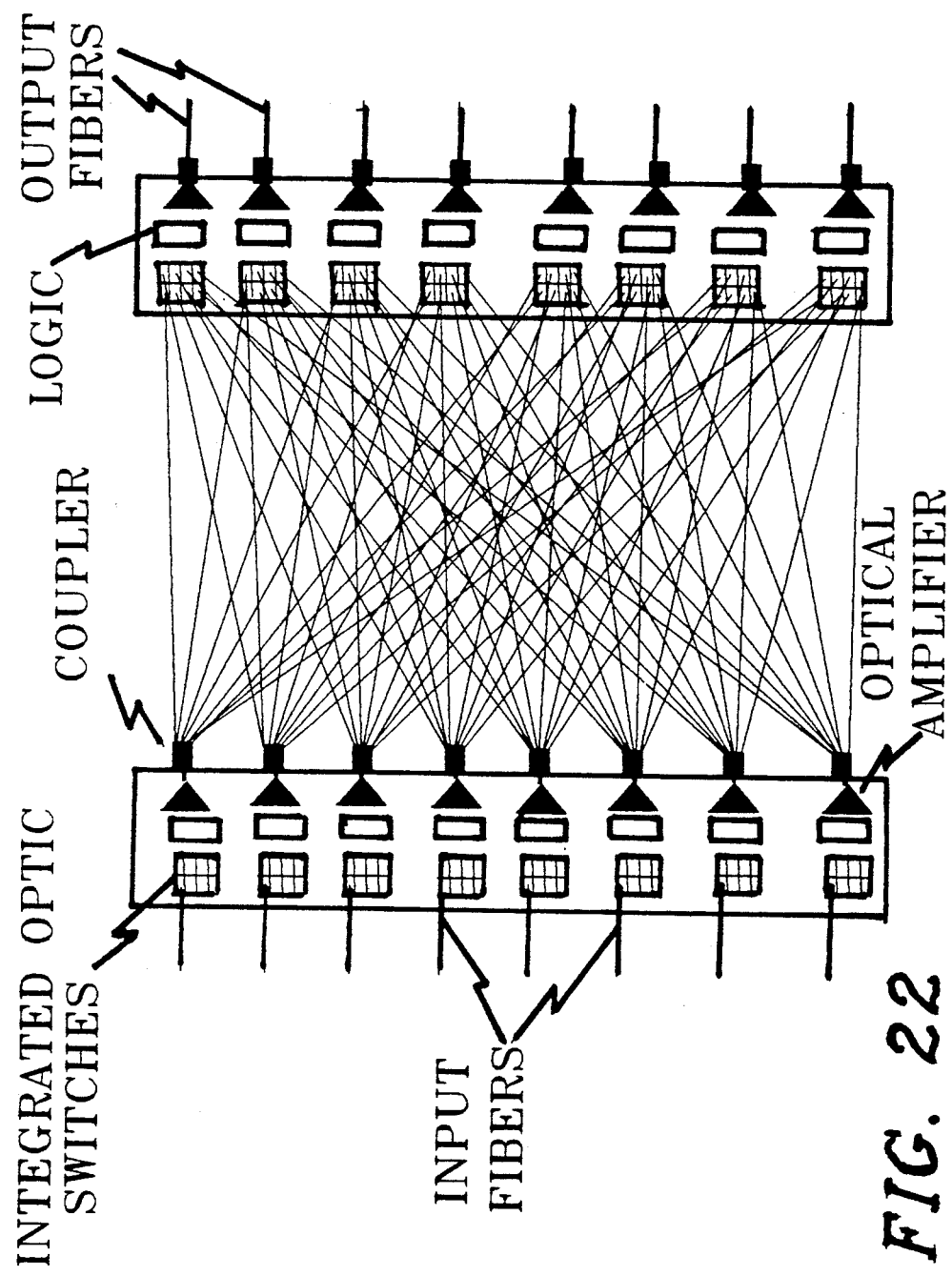
FIGS. 22A and 22B are schematics of a crossbar switch formed by interconnecting a multiplicity of fault tolerant coupler/repeaters.
Figure 22A:
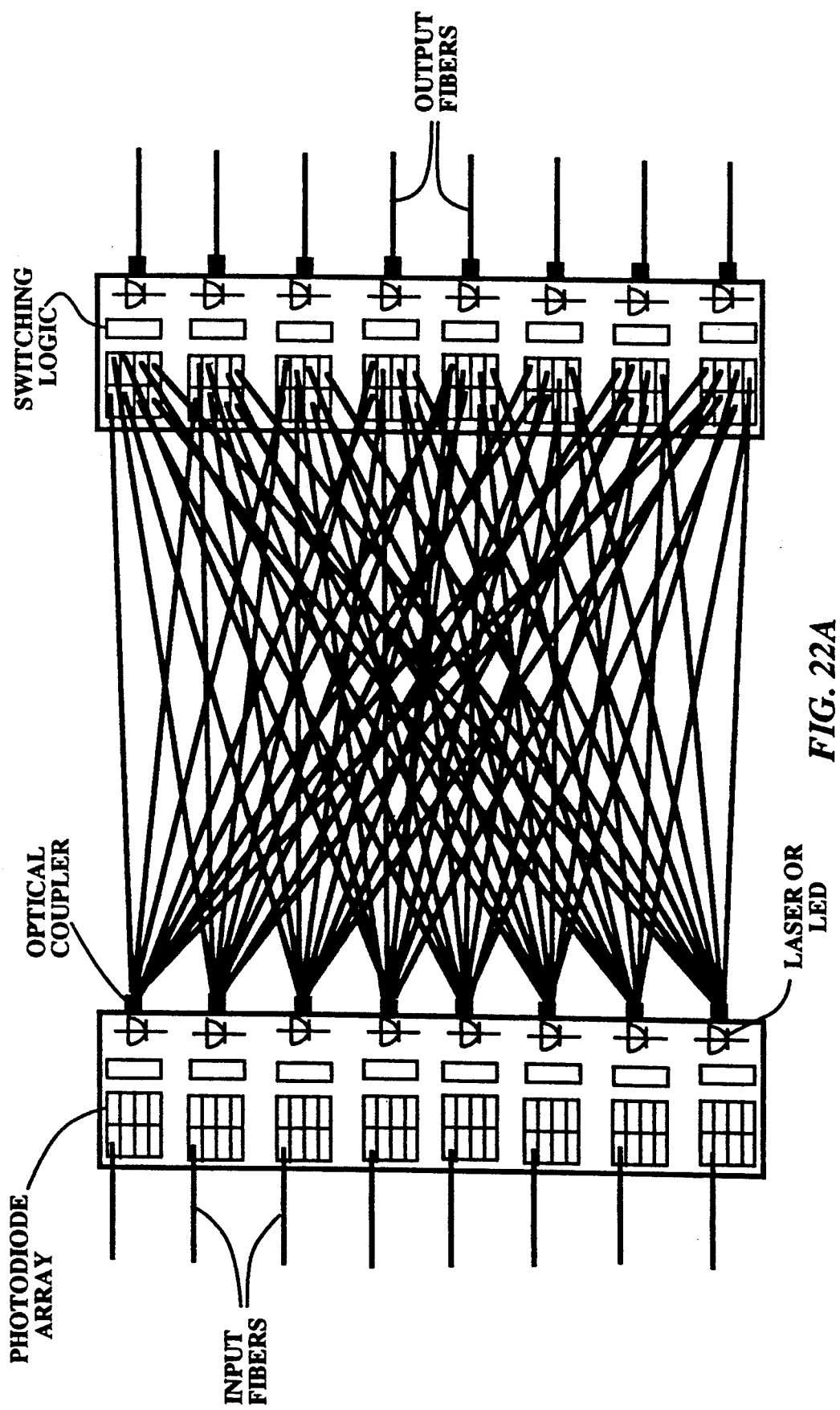
Figure 22B:
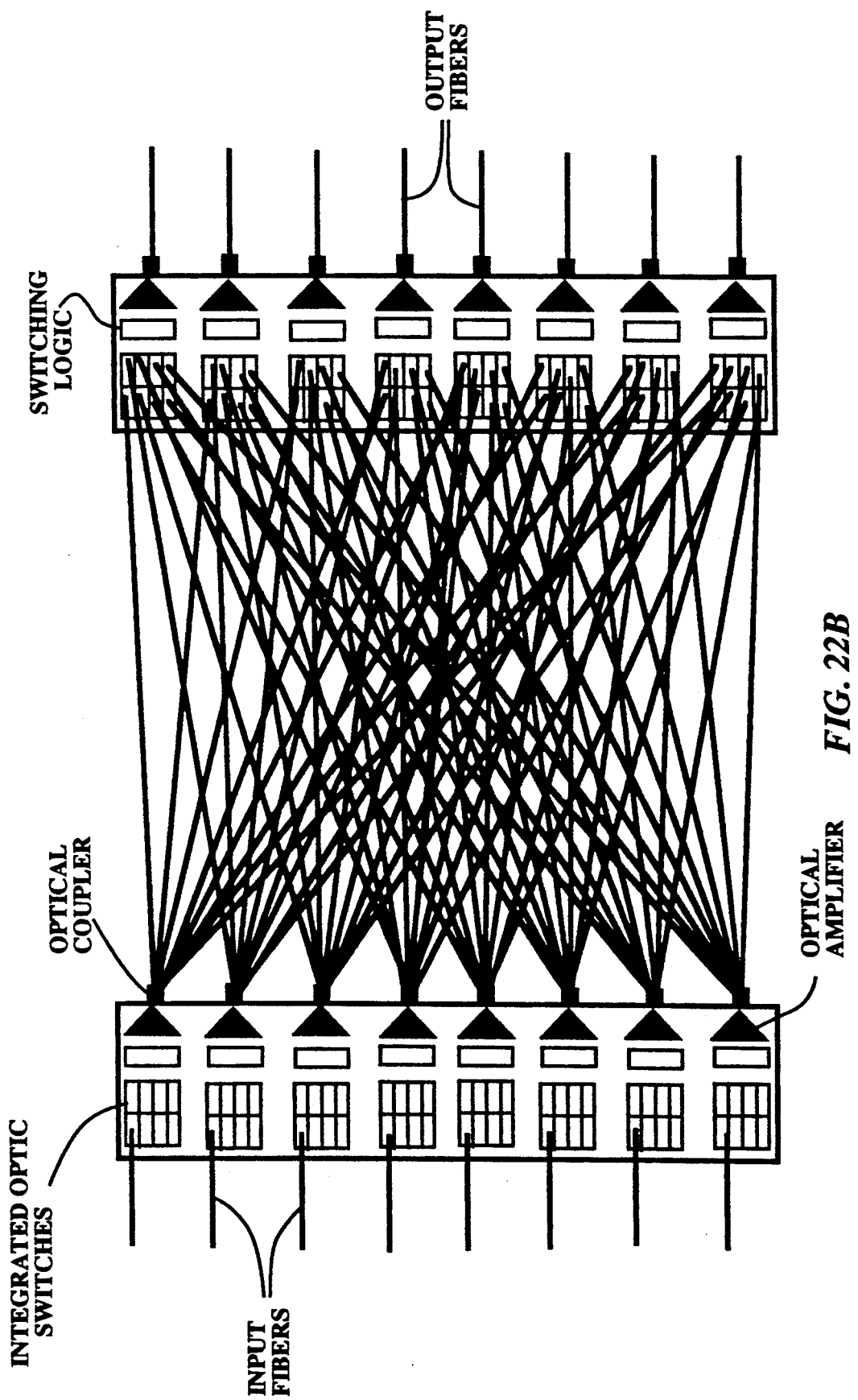

The logic circuit associated with each terminal can be programmed to accept and reject data from any of the upstream or downstream terminals based on any selected reference and to pass data on to any terminal based on a selected criterion. In fact, a terminal N can be associated with selected ones of the upstream terminals (e.g., with terminals (N−1), (N−2), (N−4), (N−6), and so forth) and/or with selected ones of the downstream terminals (e.g., with terminals (N−1), (N+3), (N+5), and so forth), and there need not be a one-to-one or even any systematic, correspondence between terminals. This multiple connectivity arrangement can serve as the basis for a crossbar switch whereby the output from any terminal can serve as the input to any other terminal. Such configurations as shown in FIGS. 22 and 22B can serve as a crossbar switch. The output of each terminal node is connected to all the inputs of selected terminals via the laser or LED arrays and waveguide couplers which serve as a fanout means. As in the case of networks, multiple photodiodes and a switching means provide the capability for selecting any of the inputs to the node. The signal to activate a selected input can be sent via any of the inputs to the terminals or broadcast to all the terminals.

Figure 5:
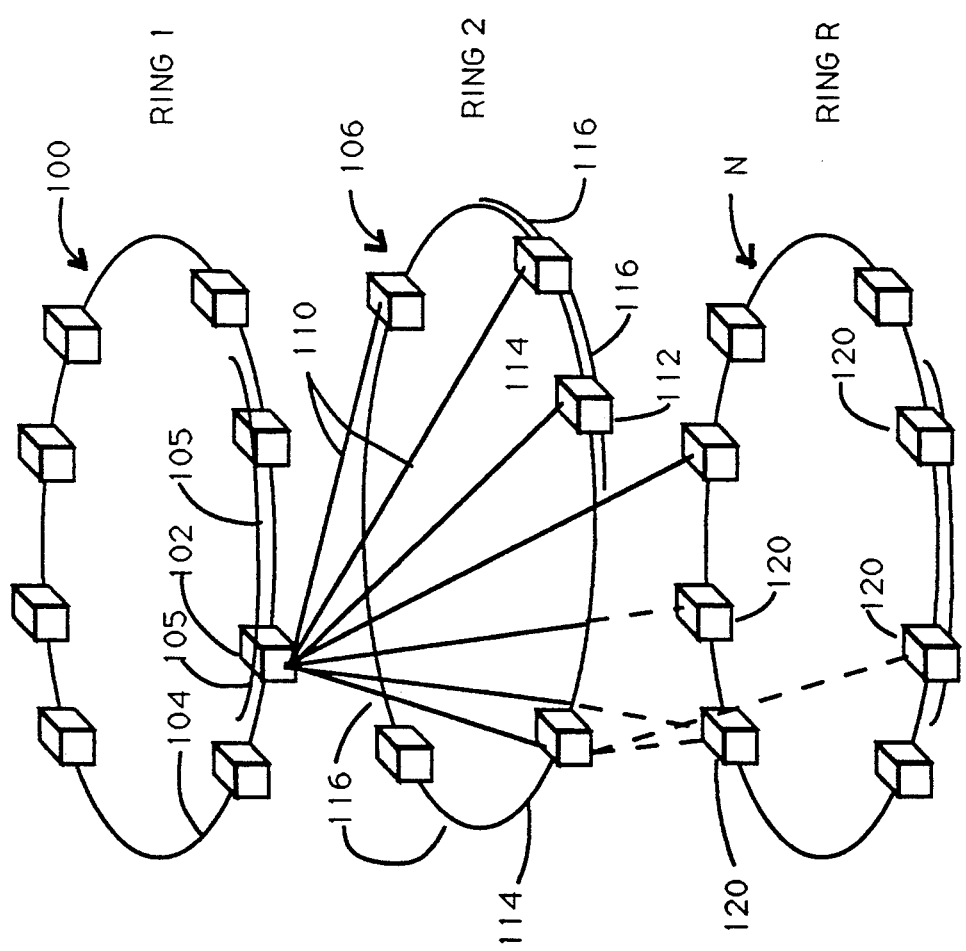
FIG. 5 is a schematic of a branched tree data transmission system.

Because the logic circuit of each terminal is so adaptable, it is ideally suited for use in a star-coupling arrangement. Such an arrangement is illustrated schematically in FIG. 5 in which a ring 100 includes N terminals 102 coupled to each other via a line 104 and can include one or more bypass lines, such as bypass line 105 in the manner discussed above. However, ring 100 is also coupled to other rings, such as ring 106 via the terminals and lines, such as line 110 connecting the terminal 102 to any or all of the terminals, such as terminal 112 of the ring 106. The terminals of the ring 106 can be interconnected with each other via a primary line 114 and a bypass line 116 as discussed above. In this manner, each terminal of each ring can be interconnected to any or all of the terminals in all other rings of the configuration. This situation is illustrated in FIG. 5 by ring R having terminals 120 connected to each other and to each or any of the terminals in each or any of the other rings of the configuration. Thus the terminal configuration of FIG. 6 can serve as a three dimensional crossbar switch for interconnecting and switching advanced computer architectures, including hypercubes and neural networks. Since the arrangement of interconnects can be multidimensional as shown in FIG. 5, the crossbar switch formed by the interconnection of multiple terminals can produce an N-dimensional crossbar switch.

Figure 15:
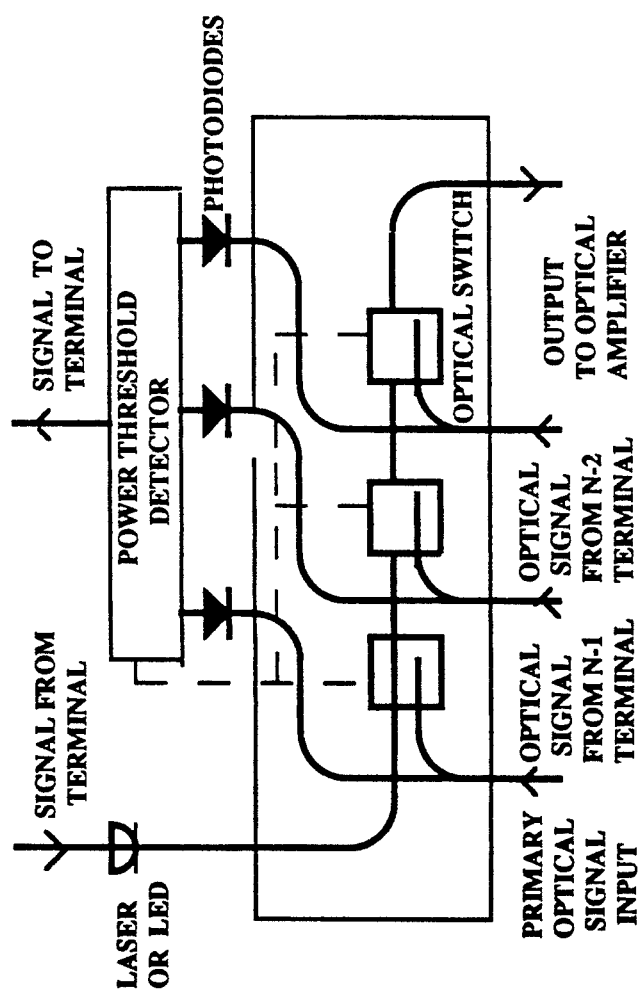
FIG. 15 is a schematic of an optical select logic means for a dual bypass terminal utilizing an integrated optic switch to switch the optical signal form the primary input fiber to either of the bypass fibers in case of a failure in the N−1 or N−2 terminals.
Figure 16:
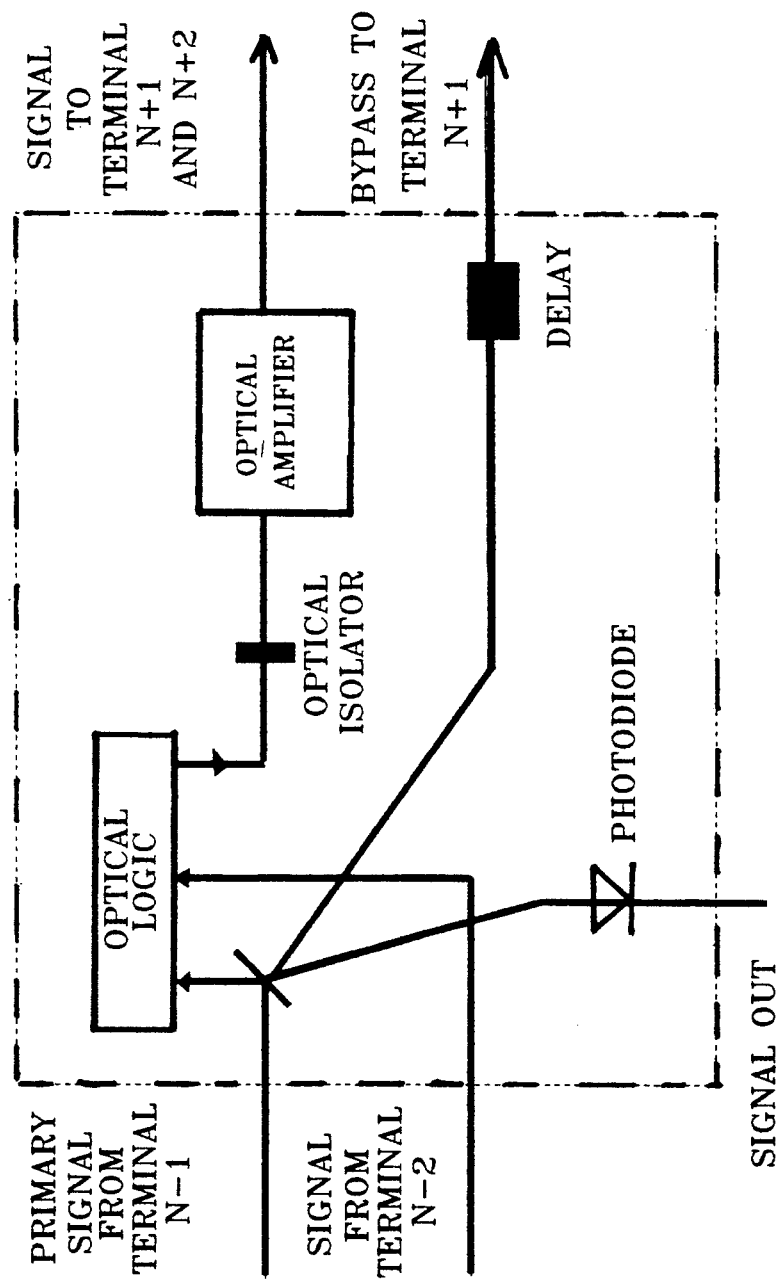
FIG. 16 is a schematic of a receive only fault tolerant terminal which utilizes optical select logic and an optical amplifier.

FIG. 14 is a schematic of a multiple bypass fault tolerant terminal with a star branching means which utilizes both optical logic for selection of the proper input signal as well as an optical amplifier to boost the signal in the primary optical fiber. This eliminates the need for an electrical switch select device and conversion of the signal from optical to electrical format prior to amplification thus reducing noise. Also shown in this figure is an optical isolator which may be utilized to suppress spurious reflections or feedback to the optical amplifier. This type of arrangement is ideally suited to the transmission of analog information such as the video signals utilized in community antenna television (CATV) systems. It is also ideal for interactive fiber-to-the home systems where two-way video is required. FIG. 15 is a schematic of the optical select logic means for a multiple bypass terminal. FIG. 16 shows a receive only terminal for receiving signals transmitted by a primary distribution source and transmitted to a large number of users such as a community antenna television (CATV) system. The optical amplifier overcomes the transmission losses without adding noise to the signal while the optical logic switches the bypass into the circuit when a fault is detected.

The logic circuits associated with each ring can be adapted to discriminate and use the most desirable data for the associated terminal based on parameters unique to the ring, if suitable, or the test parameters can be similar for all rings, if desirable.

Figure 6:
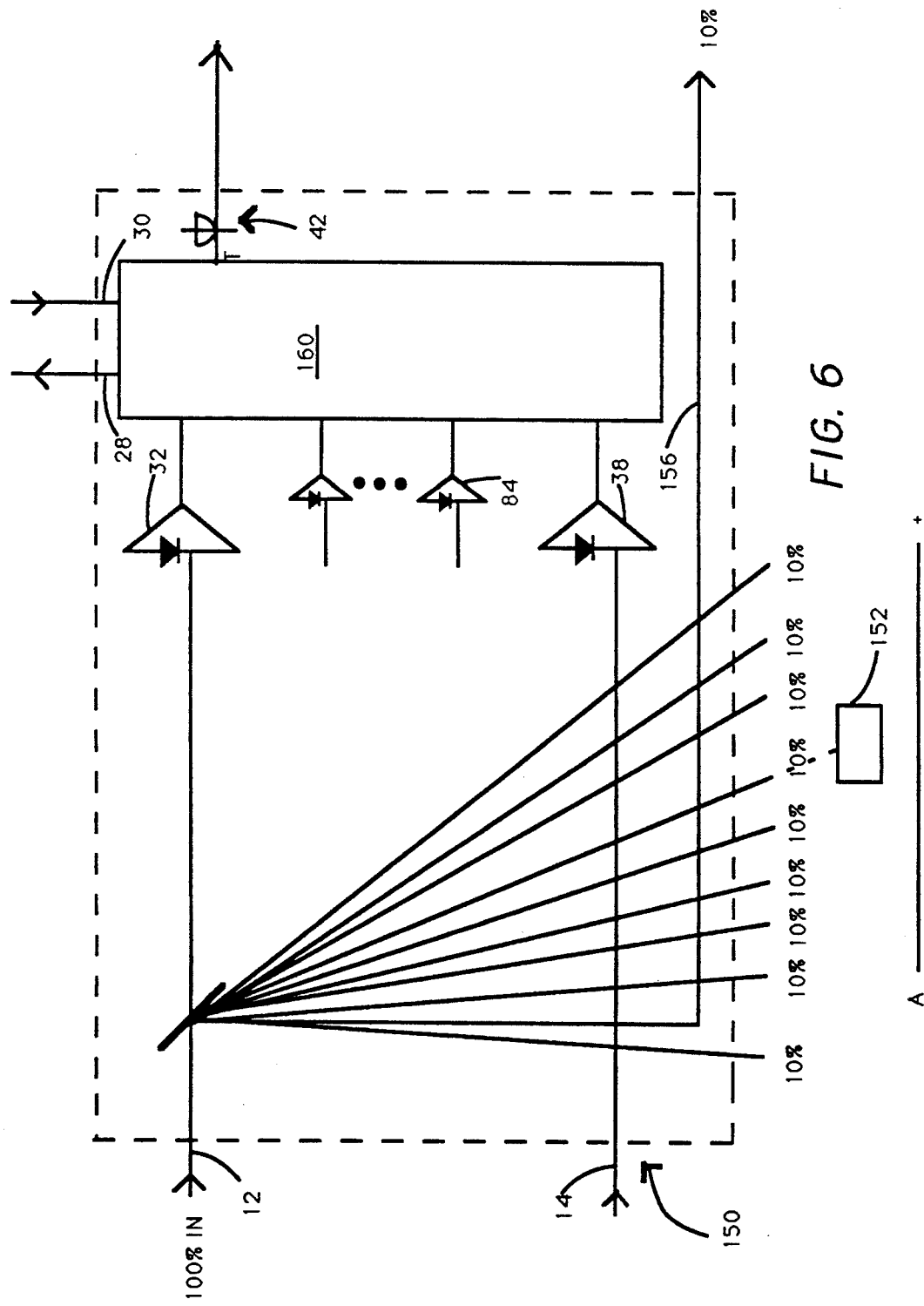
FIG. 6 is a schematic of one terminal of the FIG. 5 data transmission system.
Figure 17:
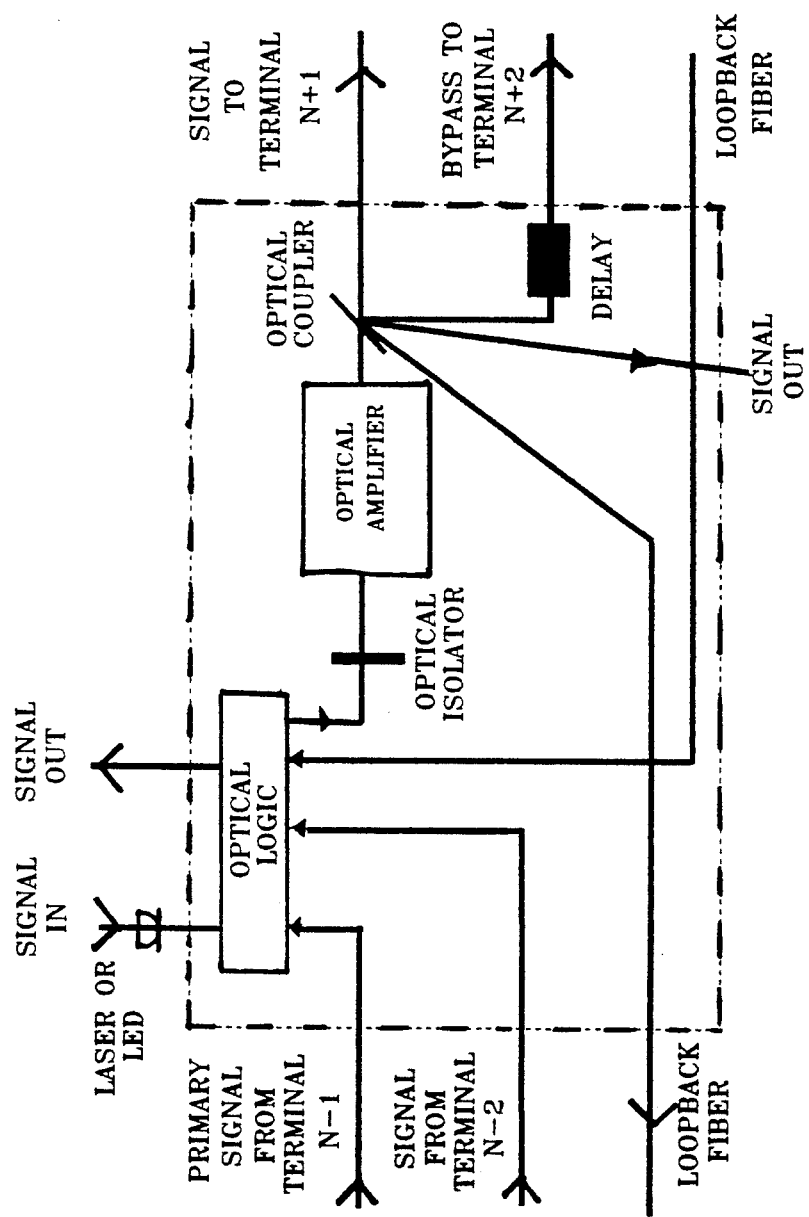
FIG. 17 is a schematic of a bidirectional terminal utilizing electrical select logic and an optical amplifier to boost the signal from the N−1 terminal.
Figure 19:
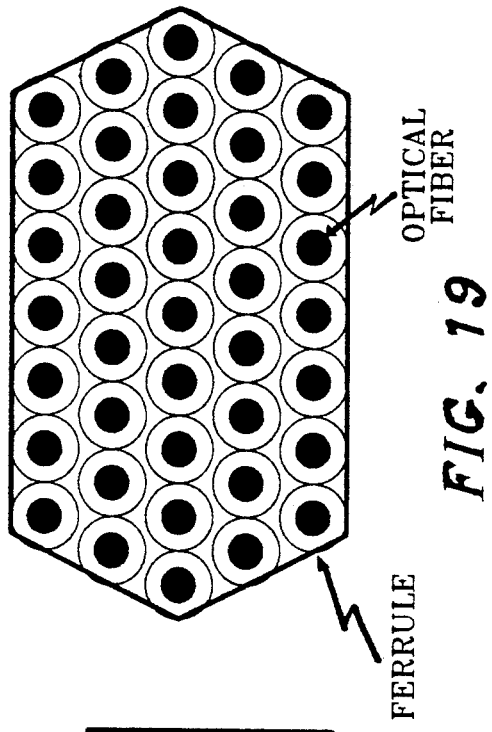
FIG. 19 is a schematic of a V-groove connector which can be embedded in a suitable material to connect to the optical backplane.

The logic circuit associated with each terminal can be set to accept or reject data having any power level. Thus, if the power of any signal is decreased due to the just-described coupling, the downstream-located logic circuits can be adjusted accordingly. Such a situation is illustrated in FIG. 6 where one terminal 150 is connected with nine other terminals, such as terminal 152 via a fusion coupler 154 and has one bypass line 156. The terminal 150 can include any number of bypass lines and can be associated with any number of bypass lines and can be associated with any number of other terminals, and the FIG. 6 configuration is shown only for the purpose of illustration, and is not intended as being limiting. The terminals can be bidirectional in nature to provide such connectivity. FIG. 11 is a bidirectional terminal which loopback provided to circumvent failure of the network if an entire cable assembly is severed. FIG. 17 is the schematic of a bidirectional terminal utilizing optical logic and optical amplifiers. Also shown is an optional optical isolator which may be utilized to suppress spurious reflections or optical feedback to the amplifier. Each of the terminals will include a logic circuit, such as logic circuit 160 of the terminal 150, connected to the other terminals as described above and adjusted accordingly to receive data from photodiodes in each of the lines connected to the terminal, such as photodiodes 32, 38 and 84.

An application of the above-describe system can be found in distributing data in an optical format between a computer or signal processor elements or modules. As discussed above, the system can be embedded on a substrate and can be used in modular form. Such modular form is indicated in FIG. 7-9. These figures do not include all of the elements, but only the optical fibers and the elements not mentioned above in the interest of clarity. However, those skilled in the art will be able to include the necessary elements in such modular configurations based on the above disclosure.

The module will include an optical backplane which includes optical fibers 160 which can be either multimode or single mode and which are embedded in a panel 162 formed of composite, ceramic or other such material to form a monolithic structure.

FIG. 8 shows an embodiment which includes a wire wrap system with optical fibers 166 interspaced between pins 168 with a flowed-on polymer on polymer or organic backfill 170 to provide a monolithic backplane.

FIG. 9 shows the systems as including a connector system so optical as well as electrical signals can be interfaced in a single module. In this manner, power, signals, and/or ground can all be interconnected to the module. Guide pins 172 can also be included as well as means 174 for connecting electronic modules to the optical modules.

The above illustration of the invention is intended to be illustrative only and is not intended to limit the scope of the invention as defined in the appended claims.

I claim:

1. A programmable electro-optic packaging and interconnect system for computers and parallel processors comprising a monolithic optical backplane that includes a plurality of network terminals which are packaged in modular form and are connected together with optical fibers, optical connectors and power/ground connections which are embedded in a substrate.

2. The programmable electro-optic packaging and interconnect system of claim 1 further including a passive fiber optic power dividing coupler embedded in the optical backplane.

3. The programmable electro-optic packaging and interconnect system of claim 1 in which said optical backplane consists of optical fibers, electrical conductors, ground lines, couplers, and connectors embedded in glass fiber/epoxy composite matrix.

4. The programmable electro-optic packaging and interconnect system of claim 1 in which said optical backplane consists of optical fibers, electrical conductors, ground lines, couplers, and connectors embedded in ceramic materials.

5. The programmable electro-optic packaging and interconnect system of claim 1 in which said optical backplane consists of optical fibers, electrical conductors, ground lines, couplers, and connectors embedded in glass materials.

6. The programmable electro-optic packaging and interconnect system of claim 1 in which said optical backplane consists of optical fibers, electrical conductors, ground lines, couplers, and connectors embedded in plastic materials.

7. The programmable electro-optic packaging and interconnect system of claim 1 in which said optical backplane consists of optical fibers, electrical conductors, ground lines, couplers, and connectors embedded in glass/ceramic materials.

8. The programmable electro-optic packaging and interconnect system of claim 1 in which said optical backplane consists of optical fibers, insulated electrical conductors, couplers, and connectors embedded in metallic materials.

9. The programmable electro-optic packaging and interconnect system of claim 1 in which said connectors utilize single crystal silicon V-groove devices.

10. The programmable electro-optic packaging and interconnect system of claim 1 in which said connectors utilize a registered array of optical fibers suitably joined together to form a mated pair connector assembly.

11. The programmable electro-optic packaging and interconnect system defined in claim 1 wherein said optical fibers and optical connectors are encased and surrounded by said substrate.

12. An optical backplane for interconnecting a plurality of data terminals comprising a monolithic structure that includes optical fibers and optical connectors embedded in a substrate material to rigidly support and surround said fibers and connectors.

13. The optical backplane defined in claim 12 wherein said monolithic structure further includes a passive fiber optic power dividing coupler embedded in said substrate material.

14. The optical backplane defined in claim 12 wherein said monolithic structure further includes electrical conductors and electrical connectors embedded in said substrate material.

15. The optical backplane defined in claim 12 wherein said substrate material includes a glass fiber/epoxy composite matrix.

16. The optical backplane defined in claim 12 wherein said substrate material includes a glass material.

17. The optical backplane defined in claim 12 wherein said substrate material includes a ceramic material.

18. The optical backplane defined in claim 12 wherein said substrate material includes a plastic material.

19. The optical backplane defined in claim 12 wherein said substrate material includes a glass/ceramic material.

20. The optical backplane defined in claim 12 wherein said substrate material includes a metallic material.

21. The optical backplane defined in claim 12 wherein said optical connectors include etched silicon V-groove devices.

22. The optical backplane defined in claim 12 wherein said optical connectors include an array of registered optical fibers joined together to form a mated pair connector assembly.

* * * * *